(12) United States Patent
Qiang

(10) Patent No.: US 10,728,615 B2
(45) Date of Patent: Jul. 28, 2020

(54) METHODS AND APPARATUS TO DETECT BORING MEDIA

(71) Applicant: The Nielsen Company (US), LLC, New York, NY (US)

(72) Inventor: Bo Qiang, Lutz, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 94 days.

(21) Appl. No.: 15/968,299

(22) Filed: May 1, 2018

(65) Prior Publication Data

US 2019/0342611 A1    Nov. 7, 2019

(51) Int. Cl.
*H04N 21/442* (2011.01)
*H04N 21/8358* (2011.01)
*H04N 21/466* (2011.01)

(52) U.S. Cl.
CPC ... *H04N 21/44213* (2013.01); *H04N 21/4666* (2013.01); *H04N 21/8358* (2013.01)

(58) Field of Classification Search
CPC .............. H04N 21/44222; H04N 7/163; H04N 7/17318; H04N 21/25891; H04H 60/45
See application file for complete search history.

(56) References Cited

U.S. PATENT DOCUMENTS

| 7,251,413 | B2 | 7/2007 | Dow et al. |
| 7,266,287 | B2 | 9/2007 | Zhang |
| 7,984,462 | B2 | 7/2011 | Deng |
| 2004/0088406 | A1* | 5/2004 | Corley ............... G06F 15/173 |
| 2008/0140479 | A1* | 6/2008 | Mello ............... G06Q 10/00 |

OTHER PUBLICATIONS

Venkatesh et al., "Chapter 29: Commercial Break Detection and Content Based Video Retrieval," Machine Learning and Systems Engineering, Sep. 9, 2010, pp. 373-383, 11 pages.

* cited by examiner

*Primary Examiner* — Anthony Bantamoi
(74) *Attorney, Agent, or Firm* — Hanley Flight & Zimmerman, LLC

(57) ABSTRACT

Methods, apparatus, systems, and articles of manufacture are disclosed for the detection of boring media. An example apparatus includes a feature calculator to determine at least a first feature and a second feature associated with at least one of a video feed or an audio feed of monitored media when a media monitoring code is not detected in the monitored media, the first and second features representing different characteristics of at least one of the video feed or the audio feed, and a boring media event determiner implemented by hardware or at least one processor to process the first and second features with a neural network, propagate a code absence alert to a first server when an output of the neural network does not satisfy a threshold, and propagate a boring media event notification to a second server when the output of the neural network does satisfy the threshold.

20 Claims, 11 Drawing Sheets

METHODS AND APPARATUS TO DETECT BORING MEDIA

FIELD OF THE DISCLOSURE

This disclosure relates generally to audience measurement and, more particularly, to methods and apparatus to detect boring media.

BACKGROUND

Media producers, media providers, advertisers, product manufactures represented in advertisements, and many other entities utilize information about the presentation of media. Such information is often collected through the use of panels comprised of persons (e.g., panelists) who have agreed to have their exposure to media monitored. For example, audio of media may be transmitted with identifying information (e.g., embedded watermarks or codes) that identifies the media. Panelists may be supplied with meters (e.g., portable meters carried and/or worn by the panelists) that collect the audio and extract the identifying information. The information may be transmitted to a collection facility where the results from multiple panelists are combined to generate reports including information about media presentation.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
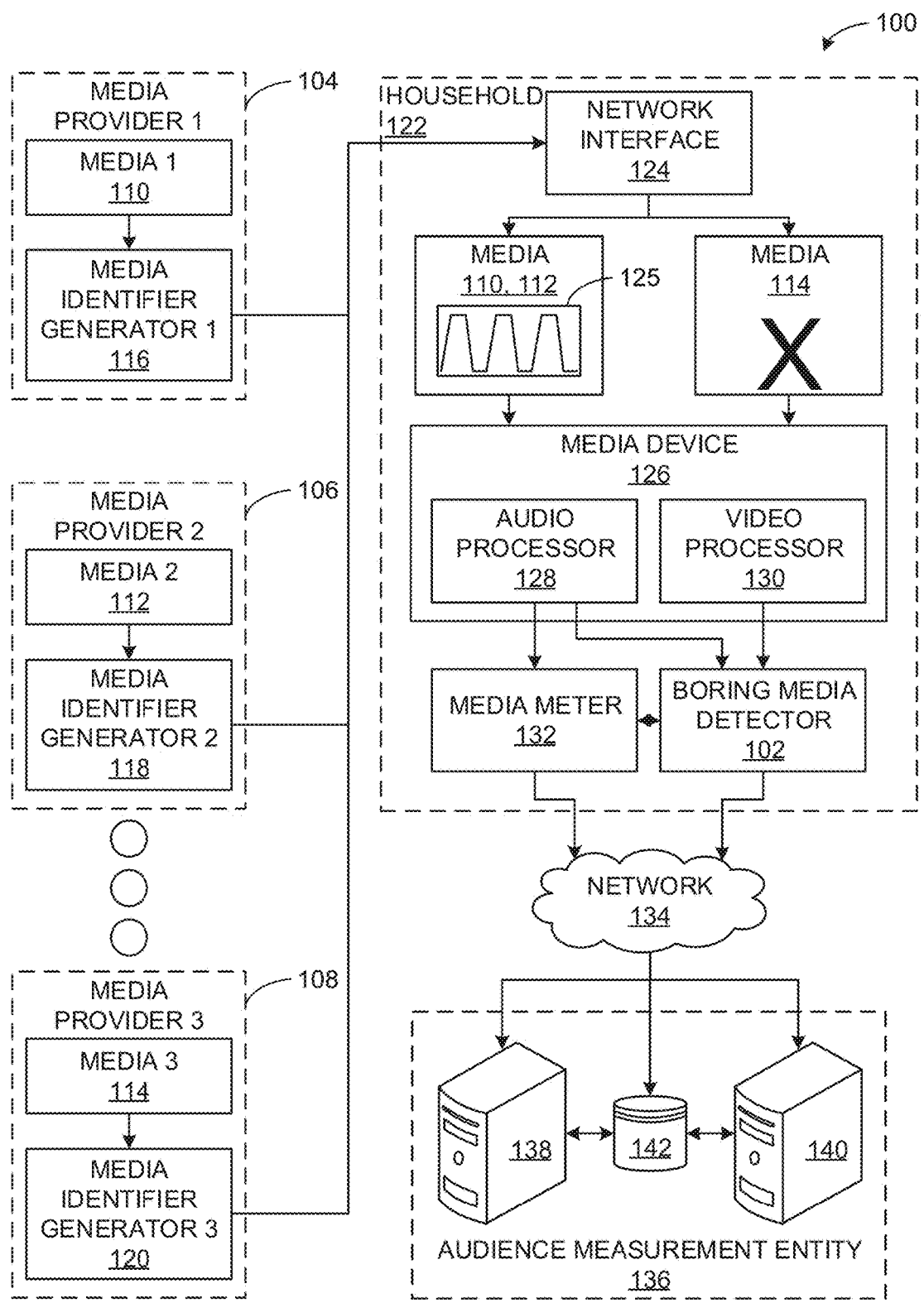
FIG. 1 is a block diagram of an example environment in which a system for detecting and identifying boring media events in media presented on media devices in accordance with teachings of this disclosure.

During some portions of a broadcast of media, the media includes media monitoring information to be obtained and processed by a media monitoring entity to perform audience measurement. In other portions of the broadcast, the media may correspond to boring media that intentionally does not include the media monitoring information and, in some examples, has audio and/or video that does not significantly change with time. A boring media event, examples of which are described in further detail in accordance with FIGS. 6A-6B, can include any media event broadcast by a media provider, but having no audience measurement value. Boring media events can include, for example, a static and/or a dynamic station identification logo, a webcam feed, a test screen, a blank screen, etc. In some instances, these boring media events are not accompanied by media monitoring information in the form of a watermark, an identifier, etc. Conversely, portions of media that do have or are intended to have an audience measurement value and/or media monitoring information (e.g., a television show, a movie, a news cast, commercials, a sporting event, etc.) are defined as non-boring media.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to reference signature(s) corresponding to known (e.g., reference) media sources. Various comparison criteria, such as a cross-correlation value, a Hamming distance, etc., can be evaluated to determine whether a monitored signature matches a particular reference signature. When a match between the monitored signature(s) and reference signatures(s) for a given reference source is(are) found, the monitored media can be identified as corresponding to the particular reference media represented by the reference signature(s) that for a given reference source is (are) matched with the monitored signature(s). Because attributes, such as an identifier of the media, a presentation time, a broadcast channel, etc., are collected for the reference signature these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

In some examples, a media monitoring entity (also referred to as an audience measurement entity) can erroneously identify media without a media monitoring code as media that should include the media monitoring code. For example, a media monitoring entity may not be aware that the media without the media monitoring code corresponds to a boring media event. In such examples, the media monitoring entity can react to the boring media event not accompanied by media monitoring information (e.g., the media monitoring code) similarly to an event where non-boring media is being presented without media identifying information. This can lead to false alarms and/or extraneous requests for media review at the media monitoring entity, which may include a human operator checking each instance where media is not accompanied by media monitoring information to determine whether there is an issue with the media provider or if the media event is simply a boring media event.

In some examples, a quantity of potential boring media events to be analyzed by the media monitoring entity can exceed a capacity of the human operator and some boring media events may not be analyzed or not analyzed substantially in real time. In addition to the increased level of man hours required to complete such tasks, false alarms can also present a networking and processing burden on the media monitoring entity. For example, in response to erroneously characterizing boring media as media without a code, the boring media is transmitted to the media monitoring entity for processing and can lead to a substantial decrease in network bandwidth when transmitting the boring media. In addition, the erroneous characterizations can lead to decreased storage resources at the media monitoring entity when storing the boring media and decreased computing resources available to perform other audience measurement processing tasks.

Disclosed example methods and apparatus to detect boring media events improve an ability of a media monitoring entity to determine when a watermark or other code such as an identifier, etc. is expected or not expected to be present in media. By detecting the boring media events, the media monitoring entity can reduce a quantity of false alarms corresponding to an inability of the media monitoring entity to determine whether the media lacking the code is intended to be lacking the code. Reducing the quantity of false alarms, in some examples, decreases at least one of an operator's time viewing the media, networking bandwidth required to transmit the false alarms, storage resources to store the media, or processing power requisite with the transmittal of false alarms.

Turning to the figures, a block diagram of an example system 100 for distributing media and detecting boring media events includes an example boring media detector 102, further described in connection with FIG. 2, for detecting and identifying boring media (e.g., boring media events). In some examples, the system 100 further includes media providers 104, 106, 108. The media providers 104, 106, 108, in some examples, include example media 110, 112, 114 for distribution, and further include example media identifier generators 116, 118, 120. The example system 100 further includes an example household 122 which can, in some examples, include an example network interface 124 coupled to an example media device 126 which, in some examples, includes an example audio processor 128 and an example video processor 130, and an example media meter 132. Further, the example system 100 can include an example network 134 to couple the household 122 to an example audience measurement entity (AME) 136 which can, in some examples, include an example crediting server 138, an example streaming media monitoring system (SMMS) server 140, and an example monitoring database 142.

The example media provider(s) 104, 106, 108 of the illustrated example of FIG. 1 correspond to any media provider (e.g., Netflix®, YouTube®, Hulu®, Amazon Video®, Sling TV, Pandora®, DirectTV®, cable television, etc.) capable of providing media for presentation. The media 110, 112, 114 provided by the media provider(s) 104, 106, 108 can be any type(s) of media, such as audio, video, multimedia, etc. In some examples, the media 110, 112, 114 can correspond to live media, streaming media, broadcast media, stored media, on-demand media, etc.

The example media identifier generators 116, 118, 120 of the illustrated example of FIG. 1 correspond to devices capable of generating media identification information (e.g., media program, media episode, media ID, media timestamp, etc.) for one or more of the media 110, 112, 114 in the form of watermarks, embedded codes, signatures, fingerprints, media identifying metadata, etc.

In some examples, the example media identifier generators 116, 118, 120 embed at least one of audio or video watermarks in at least one of the media 110, 112, 114. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identification information.

Additionally or alternatively, the example media identifier generators 116, 118, 120 generates an identifier in the form of audio signatures. As used herein, the term "fingerprint" and "signature" are used interchangeably and are defined herein to mean a proxy for identifying media that is generated from one or more inherent characteristics of the media. Signature-based media monitoring generally involves matching a monitored signature and a reference signature. When a match is found, the monitored media can be identified as corresponding to the particular reference media represented by the reference signature that matched the monitored signature and media identification information can be determined.

Additionally or alternatively, any manner of generating an identifier for the one or more media 110, 112, 114 that can be mapped to media identification information for the one or more media 110, 112, 114 can be utilized by the example media identifier generators 116, 118, 120.

The example household 122 of the illustrated example of FIG. 1 is a household in which at least one of a streamed media or a cached version of a streamed media can be presented. In some such examples, the media that is presented is the at least one of media 110, 112, 114. The example household 122 also include the network interface 124, the media device 126 which can, in some examples, include the audio processor 128 and the video processor 130, the media meter 132, and the boring media detector 102.

The example network interface 124 of the illustrated example of FIG. 1 is the Internet. However, the example network interface 124 may be implemented using any suitable wired and/or wireless network(s) or connection(s) including, for example, one or more data buses, one or more Local Area Networks (LANs), one or more wireless LANs, one or more cellular networks, one or more private networks, one or more satellite networks, one or more coaxial cables, one or more public networks, etc. The example network interface 124 enables one or more of the example media providers 104, 106, 108 to transmit or otherwise distribute the media which may or may not include an example watermark/code 125 encoded by one of the media identifier generators 116, 118 to the media device 126. In the illustrated example, the media 110 and 112 include a watermark/code whereas the media 114 does not include a watermark/code. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The example media device 126 of the illustrated example of FIG. 1 is a device that retrieves one or more media 110, 112, 114 from one or more of the media providers 104, 106, 108. In the illustrated example, the media 110, 112 includes respective codes 125 embedded by the media identifier generators 116, 118 to identify the media from the media providers 104, 106 whereas the media 114, which does not include (e.g., is missing, is undetectable, etc.) an embedded code.

In some examples, the media device 126 is capable of directly presenting media (e.g., via a display) while, in other examples, the media device 126 presents the media on separate media presentation equipment (e.g., speakers, a display, etc.). Thus, as used herein "media devices" may or may not be able to present media without assistance from a second device. Media devices are typically consumer electronics. For example, the media device 126 may be a personal computer such as a laptop computer, and thus, is capable of directly presenting media (e.g., via an integrated and/or connected display and speakers). While in the above, a personal computer is shown, any other type(s) and/or number(s) of media device(s) capable of streaming media may additionally or alternatively be used. For example, Internet-enabled mobile handsets (e.g., a smartphone, an iPod®, etc.), video game consoles (e.g., Xbox®, PlayStation® 4, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

In some examples, the media device further includes at least one of the example audio processor 128 and/or the example video processor 130. The example audio processor 128 is to process an audio feed associated with one of the media 110, 112, 114 and distribute the audio feed the boring media detector 102 and, in some examples, the media meter 132. The example video processor 130 is to process a video feed associated with one of the media 110, 112, and/or 114 and distribute the video feed to the boring media detector 102.

The example media meter 132 of the illustrated example of FIG. 1 corresponds to any device capable of at least one of detecting and decoding an identifier and/or signature in one or more of the media 110, 112, 114 of FIG. 1 as generated by the one or more media identifier generators 116, 118, 120.

In some such examples, the example media meter 132 can detect the presence of an identifier, wherein the identifier information in such examples is further to be decoded via a separate entity. Additionally or alternatively, the example media meter 132 can both detect and decode an identifier.

The example media meter 132 can further be implemented by a device worn/carried by a user (e.g., a panelist). In such examples, the media meter 132 determines media exposure data of the user, regardless of media device. Additionally or alternatively, the example media meter 132 can be implemented by a device embedded or otherwise included in the example media device 126. In such examples, the media meter 132 determines media presented at the media device 126.

Additionally, the example media meter 132 can, in response to being unable to detect a code and/or identifier (for example, the media meter 132 is unable to detect a code and/or identifier in the media 114 which does not include the code 125), notify the boring media detector 102 of the missing code.

The example network 134 of the illustrated example of FIG. 1 is the Internet. The example network 134 enables one or more of the media meter 132 and/or the boring media detector 102 to be in communication with the AME 136.

The example AME 136 of the illustrated example is a server that collects and processes media monitoring information from the media meter 132 and the boring media detector 102 to generate exposure metrics related to presented media with the crediting server 138. The AME 136 analyzes the media monitoring information to identify, for example, which media is presented, the size of an audience of the media, ratings of the media, reach out the media, which media presentation devices are the most owned, the most-frequently used, the least-frequently owned, the least-frequently used, the most/least-frequently used for particular type(s) and/or genre(s) of media, and/or any other media statistics or aggregate information that may be determined from the data. The media presentation device information may also be correlated or processed with factors such as geodemographic data (e.g., a geographic location of the media exposure measurement location, age(s) of the panelist(s) associated with the media exposure measurement location, an income level of a panelist, etc.). Media presentation device information may be useful to manufacturers and/or advertisers to determine which features should be improved, determine which features are popular among users, identify geodemographic trends with respect to media presentation devices, identify market opportunities, and/or otherwise evaluate their own and/or their competitors' products.

In the illustrated example, the AME 136 receives Internet messages (e.g., HyperText Transfer Protocol (HTTP) requests) that include the metering information from the network 134. Additionally or alternatively, any other method(s) to receive metering information may be used such as, for example, an HTTP Secure protocol (HTTPS), a file transfer protocol (FTP), a secure file transfer protocol (SFTP), etc. Further, the AME 136 can, in some such examples, include or otherwise implement the SMMS server 140 and the monitoring database 142.

The SMMS server 140, implemented by the AME 136, can determine when the media meter 132 does not detect a code and/or identifier and when the boring media detector 102 does not identify the corresponding media event as boring media. In some examples, in response to determining that normal media (e.g., non-boring media) does not include a code and/or identifier, the SMMS server 140 can distribute an alert (e.g., an alarm or other notification).

The example monitoring database 142 of the illustrated example of FIG. 1 corresponds to a database which can, in some examples, store media crediting information (e.g., ratings data) generated by the crediting server 138. Additionally, the monitoring database 142 can, in some examples, store one or more SMMS alerts as generated by the SMMS server 140. Additionally or alternatively, one or more media credits and/or SMMS alerts as stored in the monitoring database 142 can further be at least one of retrieved and/or searched by one of the crediting server 138 and/or the SMMS server 140.

The example monitoring database 142 can be implemented by a volatile memory (e.g., a Synchronous Dynamic Random Access Memory (SDRAM), a Dynamic Random Access Memory (DRAM), RAMBUS Dynamic Random Access Memory (RDAM), etc.) and/or a non-volatile memory (e.g., flash memory). The example monitoring database 142 can additionally or alternatively be implemented by one or more mass storage devices such as hard disk drive(s), compact disk drive(s), digital versatile disk drive(s), solid-state drives(s), etc. While in the illustration the example monitoring database 142 is illustrated as a single database, the example monitoring database 142 can be implemented by any number and/or type(s) of databases.

The example system 100 of FIG. 1 includes three media providers 104, 106, 108, three media 110, 112, 114, three media identifier generators 116, 118, 120, one household 122, one network interface 124, one code 125, one media device 126, one audio processor 128, one video processor 130, one network 134, one AME 136, one crediting server 138, one SMMS server 140, and one monitoring database 142. However, detection and identification of boring media events as disclosed herein can be used with any number(s) of media providers, media, media identifier generators, households, network interfaces, codes, media devices, audio processors, video processors, networks, AMEs, crediting servers, SMMS servers, and/or monitoring databases. Further, although the media device 126, the media meter 132, and the boring media detector 102 are illustrated as being separate elements in FIG. 1, at least one of the media meter 132 or the boring media detector 102 can be implemented by or otherwise included in the media device 126. Additionally or alternatively, although the boring media detector 102 is located in the household 122 as illustrated in FIG. 1, the boring media detector 102 can, in some examples, be located at one of the media provider(s) 104, 106, 108, and/or at the AME 136.

Figure 2:
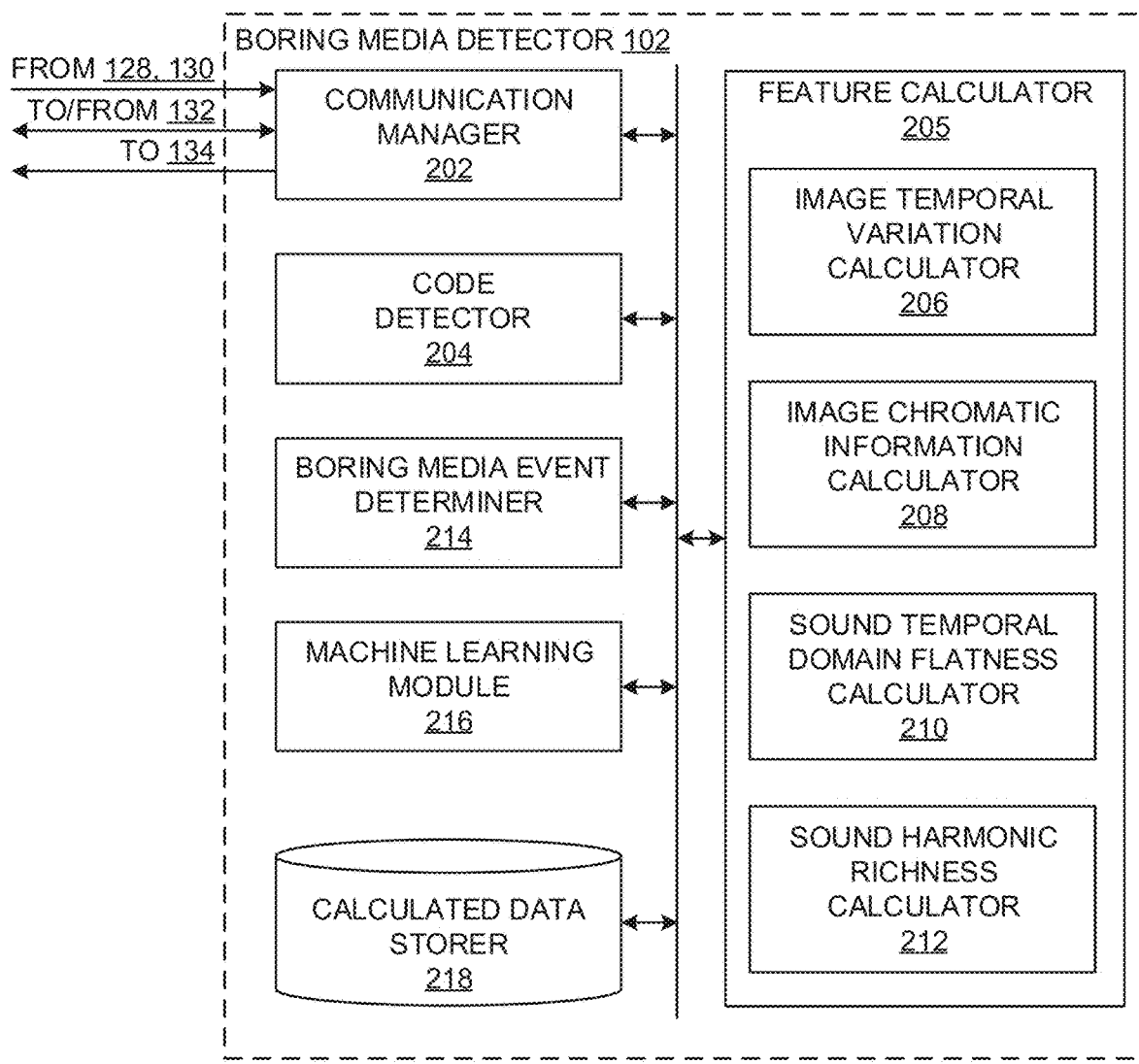
FIG. 2 is a block diagram of an example implementation of an example boring media detector included in the system of FIG. 1.

A block diagram of an example implementation of the boring media detector 102 of FIG. 1 is illustrated in FIG. 2. The example boring media detector 102 of FIG. 2 employs machine learning techniques to determine and identify whether one or more instances of media are boring media. Further, the example boring media detector 102 of FIG. 2, in operation, uses feature values calculated from at least one of audio data and video data of one or more known instances of boring media and one or more instances of non-boring media to train a neural network with machine learning techniques. Once validated (e.g., known to correctly predict boring media for a certain proportion of media events), a trained neural network including one or more trained weights is deployed. In response to receiving a media event that is determined not to include media monitoring information, the boring media detector 102 calculates feature values based on audio data and video data of the media event and, using the trained neural network, predicts whether the media event is boring media or non-boring media.

Looking to FIG. 2, the boring media detector 102 includes or otherwise implements an example communication manager 202, an example code detector 204, an example feature calculator 205 an example boring media event determiner 214, an example machine learning module 216, and example calculated data storer 218. The feature calculator 205 includes or otherwise implements an example image temporal variation calculator 206, an example image chromatic information calculator 208, an example sound temporal domain flatness calculator 210, and an example sound harmonic richness calculator 212.

In the illustrated example of FIG. 2, the communication manager 202, included in or otherwise implemented by the boring media detector 102, can transfer data to and/or receive data from at least one of the audio processor 128, the video processor 130, the media meter 132, or the network 134 of FIG. 1. In some examples, the communication manager 202 can transfer data to and/or receive data from any component of the boring media detector 102. In some examples, the communication manager 202 can be implemented by any type of interface standards, such as an Ethernet interface, a universal serial bus (USB), and/or a Peripheral Component Interconnect (PCI) Express interface. Further, in some examples the interface standard of the communication manager 202 is to at least one of match the interface of the audio processor 128, the video processor 130, the media meter 132, or the network 134, or is to be converted to match the interface of the audio processor 128, the video processor 130, the media meter 132, and/or the network 134.

The boring media detector 102 further implements or otherwise includes the example code detector 204. As illustrated in FIG. 2, the code detector 204 detects one or more codes/watermarks present in media. In some examples, the code detector 204 detects the one or more codes present in media and determines that the media does include the one or more codes. In other examples, the code detector 204 does not detect the one or more codes present in the media and determines that the media does not include codes and/or that any codes included in the media are unreadable and/or otherwise undetectable by the code detector 204.

Additionally or alternatively, the code detector 204 can receive a notification from the media meter 132 via the communication manager 202 including at least one of an alert that given monitored media does include a code or an alert that the media does not include the code. In some examples, an inability of the code detector 204 to detect a code in given monitored media can trigger the boring media detector 102 to begin a boring media detection routine.

In some examples, the boring media detector 102 further implements or otherwise includes the example feature calculator 205. In some examples, in response to the code detector 204 being unable to detect a code in media and/or the code detector 204 receiving a notification from the media meter 132 indicating that the media meter 132 was unable to detect a code in the media, the feature calculator 205 receives at least one of an audio feed of the media from the audio processor 128 included in the media device 126 and/or a video feed of the media from the video processor 130 included in the media device 126.

In some examples, the length (e.g., 30 seconds, 1 minute, etc.) of the audio feed and/or the video feed is substantially similar and is predetermined. In some examples, the length of the audio feed and/or the video feed is determined based on the length of the media (e.g., when the length of the media is less than the predetermined length of the audio feed and video feed). In response to receiving the video feed and the audio feed, the feature calculator 205 distributes the video feed to one or both of the image temporal variation calculator 206 and/or the image chromatic information calculator 208 and distributes the audio feed to one or both of the sound temporal domain flatness calculator 210 and/or the sound harmonic richness calculator 212, respectively.

The image temporal variation calculator 206, included in or otherwise implemented by the boring media detector 102, calculates an image temporal variation (ITV) value by calculating at least one of a red, a green, or a blue plane (e.g., a two dimensional matrix which calculates the red, green, and/or blue contribution to each pixel of a display) of each frame/image (e.g., a 60 second video at 30 frames per second includes 1,800 frames/images) of the video feed. In some examples, the image temporal variation calculator 206 calculates the average contribution of the red, green, and/or blue plane for the duration of the media event (e.g., by summing up the contributions and dividing by the quantity of frames/images) In Eq. 1 below, $I_i^r$, $I_i^g$, and $I_i^b$ represent the red, green, and blue planes of the $i^{th}$ image of the video feed, respectively, and $\bar{I^r}$, $\bar{I^g}$, and $\bar{I^b}$ represent the average red, green, and blue plane over the duration of the video. The image temporal variation calculator 206 uses these values to calculate ITV in accordance with Equation (1):

$$ITV = \log[\text{median}(I_i^r - \bar{I^r}) + \text{median}(I_i^g - \bar{I^g}) + \text{median}(I_i^b - \bar{I^b})] \quad \text{Equation (1)}$$

The ITV value as calculated by the image temporal variation calculator 206 represents how much the motion changes among image frames of a video feed over a defined time window. Compared to non-boring media, some boring media include little or no change/motion over a short period of time (e.g., approximately 1 minute). However, this property can result in false negatives and/or false positives when used alone since some boring media has a large rotating icon, which may cause false negative detection because of the substantial motion among images inherent with the rotation. Additionally, some non-boring media (e.g., talk shows) includes negligible motion among images, which may cause false positive detection.

The image chromatic information calculator 208, included in or otherwise implemented by the boring media detector 102, calculates an image chromatic information value (ICI) value by calculating at least one of a red, a green, and/or a blue histogram (e.g., a one dimensional vector which calculates the red, green, and/or blue contribution to the overall display with respect to time/frame) for the video feed. In the example of Equation (2) below, $p^r$, $p^g$, and $p^b$ are one dimensional vectors and represent the red, green, and blue histograms (with respect to time and/or frame in the video feed) of the video feed, respectively. These values are used by the image chromatic information calculator 208 to calculate ICI in accordance with Equation (2):

$$ICI = \Sigma[-p^r \log(p^r)] + \Sigma[-p^g \log(p^g)] + \Sigma[-p^b \log(p^b)] \quad \text{Equation (2)}$$

The ICI value as calculated by the image chromatic information calculator 208 represents how much the image frames of a video feed change in color over the duration of the media event. Some boring media has a large portion of monochromatic background (e.g., usually dark or white). However, when used alone, this property can cause false positive detection since some non-boring media also has a prolonged, dark theme.

The sound temporal domain flatness calculator 210, included in or otherwise implemented by the boring media detector 102, calculates a sound temporal domain flatness value (STF) value by calculating an envelope (e.g., a maximum intensity (e.g., decibel level)) of the audio feed. In some examples, this is accomplished using at least one of a Hilbert transform and/or low pass filtering. In Equation (3) below, s is a one-dimensional vector representing the envelope value of each instance of the audio over the duration of the audio feed. The temporal domain flatness calculator uses this value to calculate STF in accordance with Equation (3):

$$STF = std[env(s)]/\text{mean}[env(s)] \quad \text{Equation (3)}$$

The STF value as calculated by the sound temporal domain flatness calculator 210 represents how much the intensity (e.g., the loudness, the decibel level, etc.) of the audio feed varies over the duration of the media event. For typical boring media, audio energy is distributed approximately evenly over time. However, some non-boring media has periods that also have little up and down change (e.g., silence in a movie) in the audio signal strength. Thus, when used alone, the STF value can cause false positive detection.

The sound harmonic richness calculator 212, included in or otherwise implemented by the boring media detector 102, calculates a sound harmonic richness (SHR) value by calculating a Fourier transform (e.g., a Fast Fourier Transform (FFT)) of the audio feed to determine the frequency contributions to the audio feed of each element included in the audio feed. In Equation (4) below, s is a one dimensional vector representing the audio feed, FFT(s) is the result of the Fast Fourier Transform of the audio feed s, $[FFT(s)]_t$ is a number of instances of the result of the FFT exceeding a threshold t, and N is the total number of elements present in the audio feed. The sound harmonic richness calculator 212 use these values to calculate SHR in accordance with Equation (4):

$$SHR = \log\{[FFT(s)]_t/N\} \quad \text{Equation (4)}$$

The SHR value as calculated by sound harmonic richness calculator 212 represents how much a frequency of the audio feed of the media event changes over the duration of the media event. The SHR value can be used to identify a boring video because some boring media has a constant, uni-frequency tone throughout its duration, which can lead to a relatively low SHR value. Some boring media has a constant, uni-frequency tone throughout its duration. However, when used alone, the SHR value can cause false negative detection since some boring media can also play background music The boring media event determiner 214, included in or otherwise implemented by the boring media detector 102, utilizes the trained boring media detection neural network received from the machine learning module 216 to determine whether a media event is a boring media event or a non-boring media event. Further in such examples, the boring media event determiner 214 receives determined values (e.g., calculated values including at least one of ITV, ICI, STF, SHR, etc.) for the media event from the feature calculator 205.

Upon receiving the determined values, the boring media event determiner 214 inputs the values into the trained boring media detection neural network, wherein the trained boring media detection neural network performs one or more mathematical operations on the values to determine an output. For example, the trained boring media detection neural network can multiply each of the determined values received from the feature calculator 205 by a constant.

Additionally or alternatively, the trained boring media detection neural network can at least one of add, subtract, and/or multiply one or more of the determined values together. Additionally or alternatively, the trained boring media detection neural network can convert each of the determined values to a binary value (e.g., a one (1) or a zero (0)) based on the magnitude of each of the determined values.

Once the output value is determined by the trained boring media detection neural network, the boring media event determiner 214 is further to compare the output value to a threshold. In some examples, the threshold is a predetermined value that is static throughout the operation of the boring media detector 102. For example, the threshold may be based on an accuracy requirement as determined by the AME 136 of FIG. 1. In some examples, the threshold is a dynamic value that varies with the quantity of training data that is used by an example neural network, such as the neural network 302 of FIG. 3 to generate the neural network deployed to the boring media event determiner 214.

In response to the output value satisfying the threshold, the boring media event determiner 214 is further to determine the media is boring media (e.g., there is intentionally no code in the media) and propagate a notification to the example crediting server 140 of FIG. 1 denoting as such. Further in such an example, the boring media event determiner 214 distributes the values calculated by the feature calculator 205 correlated with the media event to the calculated data storer 218 for storage. Alternatively, in response to the output value not satisfying the threshold, the boring media event determine 214 is further to determine the media is not boring media (e.g., there should, in some examples, be one or more codes in the media) and propagate an alert to the example SMMS server 140 of FIG. 1 denoting as such.

Figure 3:
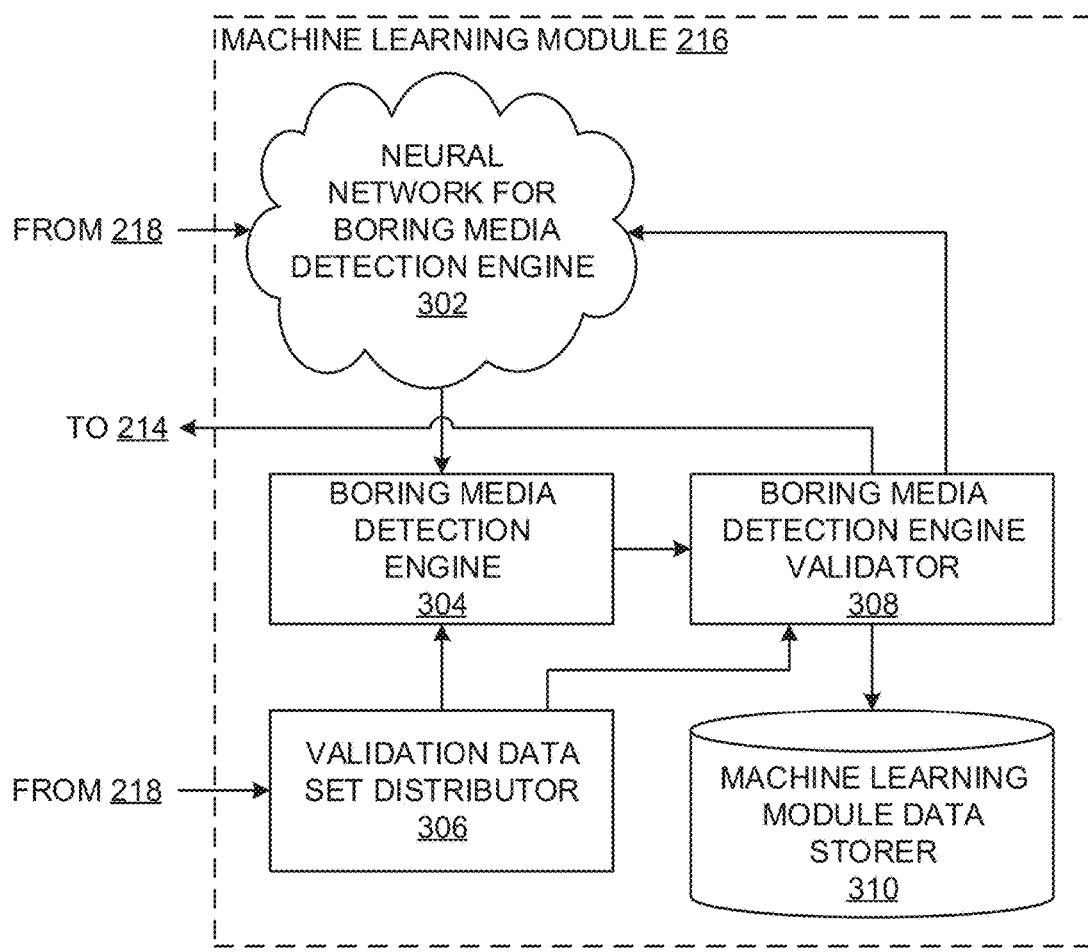
FIG. 3 is a block diagram of an example implementation of an example machine learning module of FIG. 2.

The machine learning module 216, included in or otherwise implemented by the boring media detector 102, generates and/or validates a trained boring media detection neural network using machine learning techniques and is described in further detail in conjunction with FIG. 3. In response to the generation of the trained boring media detection neural network, the machine learning module 216 can, in some examples, deploy the trained network to the boring media event determiner 214.

The calculated data storer 218 of the illustrated example boring media detector 102 stores determined (e.g., calculated) values as calculated by at least one of the image temporal variation calculator 206, the image chromatic information calculator 208, the sound temporal domain flatness calculator 210, or the sound harmonic richness calculator 212. Additionally or alternatively, the calculated data storer 218 can store one or more media assets for known boring and/or non-boring media events.

The calculated data storer 218 can further store at least one of boring media determinations or non-boring media determinations correlated with the determined values. In some examples, at least one of the calculated values or media determinations stored in the calculated data storer 218 can be used as training data by the machine learning module 216 to train and/or retrain the boring media detection neural network.

The example calculated data storer 218 can be implemented by a volatile memory (e.g., a Synchronous Dynamic Random Access Memory (SDRAM), a Dynamic Random Access Memory (DRAM), RAMBUS Dynamic Random Access Memory (RDAM), etc.) and/or a non-volatile memory (e.g., flash memory). The example calculated data storer 218 can additionally or alternatively be implemented by one or more mass storage devices such as hard disk drive(s), compact disk drive(s), digital versatile disk drive(s), solid-state drives(s), etc. While in the illustration the example calculated data storer 218 is illustrated as a single database, example calculated data storer 218 can be implemented by any number and/or type(s) of databases.

FIG. 3 is a block diagram of an example implementation of the example machine learning module 216 of FIG. 2. The machine learning module 216, in some examples, includes an example neural network 302, an example boring media detection engine 304, an example validation data set distributor 306, and example boring media detection engine validator 308, and an example machine learning module data storer 310.

In the boring media detection engine 304 of the example FIG. 3, the boring media detection process is driven by the neural network 302 and the validation data set distributor 306. The boring media detection engine 304 utilizes a trained boring media detection neural network provided by the neural network 302 to generate boring media determinations for one or more media events. The neural network 302, in some examples, deploys the trained boring media detection neural network to the boring media detection engine 304 to generate more accurate results.

An artificial neural network such as the neural network 302 is a computer system architecture model that learns to do tasks and/or provide responses based on evaluation or "learning" from examples having known inputs and known outputs. A neural network such as the neural network 302 features a series of interconnected nodes referred to as "neurons" or nodes. Input nodes are activated from an outside source/stimulus, such as input from the calculated data storer 218. The input nodes activate other internal network nodes according to connections between nodes (e.g., governed by machine parameters, prior relationships, etc.). The connections are dynamic and can change based on feedback, training, etc. By changing the connections, an output of the neural network 302 can be improved or optimized to produce more/most accurate results. For example, the neural network 302 can be trained using information from one or more sources to map inputs to a boring media determination, etc.

Machine learning techniques, whether neural networks, deep learning networks, support vector machines, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

For example, deep learning that utilizes a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network such as the neural network 302 can provide direct feedback to another process, such as the boring media detection engine 304, etc. In certain examples, the neural network 302 outputs data that is buffered (e.g., via the cloud, etc.) and validated before it is provided to another process.

In the example of FIG. 3, the neural network 302 receives input of previous calculated data (e.g., ITV data, ICI data, STF data, SHR data, etc.) for a portion of boring media events and/or non-boring media events (e.g., media assets) from the calculated data storer 218 and, through a comparison of the boring media events to calculated data for non-boring media events received from the calculated data storer 218, outputs an algorithm (e.g., a trained boring media detection neural network) to the boring media detection engine 304 to determine (e.g., predict) whether a media event is a boring media event based on previously received data for the known boring media events. The network 302 can be seeded with some initial correlations and can then learn from ongoing experience. In some examples, the neural network 302 continuously receives feedback from the calculated data storer 218.

The trained boring media detection neural network deployed to the boring media detection engine 304 is, in some examples, validated using previously calculated data (e.g., ITV data, ICI data, STF data, SHR data, etc.) for a portion of boring media events and/or non-boring media events (e.g., media assets) from the calculated data storer 218 different from the portion of data from the calculated data storer 218 used to train the neural network 302. For example, 80% of the previously calculated data may be used to train the neural network 302 and 20% of the previously calculated data can be used to validate the trained neural network deployed to the boring media detection engine 304.

In some examples, the validation process includes the validation data set distributor 306 distributing calculated data (e.g., ITV data, ICI data, STF data, SHR data, etc.) for known boring media events and/or non-boring media events to the boring media detection engine 304 to be executed with the currently deployed trained network and the known result (e.g., the media event is a boring media event or a non-boring media event) for the media event to the boring media detection engine validator 308. The boring media detection engine 304, using the currently deployed trained network, determines (e.g., predicts) whether the media events are boring and/or standard and distributes the determinations to the boring media detection engine validator 308.

In response to receiving the known results from the validation data set distributor 306 and the determined (e.g., predicted) results from the boring media detection engine 304, the boring media detection engine validator 308 compares the two (2) data sets and determines a portion of the results that the neural network executing on the boring media detection engine 304 determined correctly. For example, the boring media detection engine validator 308 can determine a percentage (e.g., 98% correct, 90% correct, 40% correct, etc.) of the results the neural network determined correctly and compare the percentage to a threshold.

In some examples, the threshold is a predetermined value that is static throughout the operation of the boring media detector 102. For example, the threshold may be based on an accuracy requirement as determined by the AME 136 of FIG. 1. In some examples, the threshold is a dynamic value that varies with the quantity of training data that is used by the neural network 302 to generate the neural network deployed by the boring media detection engine 304. In some examples, in response to the result satisfying the threshold (e.g., the result is greater than the threshold, the result is less than the threshold, etc.), the boring media detection neural network is deployed to the boring media event determiner 214 of FIG. 2. In some examples, in response to the result not satisfying the threshold, the boring media detection engine validator 308 notifies the neural network 302 that further training/re-training is required.

Further, once the neural network 302 reaches a desired level of accuracy (e.g., the result satisfies the threshold), the boring media detection engine validator 308 is further to deploy the generated network (e.g., a trained boring media detection neural network) to the boring media event determiner 214. In the example of FIG. 3, throughout the operational life of the machine learning module 216, the neural network 302 is continuously trained via feedback (e.g., additional calculated values for boring media events and/or non-boring media events) and the boring media detection engine 304 can be updated based on an updated trained neural network generated by the neural network 302. The network 302 can learn and evolve based on role, location, situation, etc.

In some examples, once the boring media detection engine validator 308 validates (e.g., accepts) the generated network, at least one of the trained boring media detection neural network deployed from the neural network 302, boring media event determinations as determined by the boring media detection engine 304, and/or network validation data as determined by the boring media detection engine validator 308 can be stored in the machine learning module data storer 310, included in or otherwise implemented by the machine learning module 216. In some examples, the machine learning module data storer 310 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The machine learning module data storer 310 can additionally or alternatively be implemented by one or more double data rate (DDR) memories such as DDR, DDR2, DDR3, mobile DDR (mDDR), etc. The machine learning module data storer 310 can additionally or alternatively be implemented by one or more mass storage devices such as hard disk drive(s), compact disk drive(s), digital versatile disk drive(s), etc. While in the illustrated example the machine learning module data storer 310 is illustrated as a single database, the machine learning module data storer 310 can be implemented by any number and/or type(s) of databases. Further, the data stored in the machine learning module data storer 310 can be in any format such as binary data, comma delimited data, tab delimited data, structured query language (SQL) structures, etc.

While an example manner of implementing the boring media detector 102 of FIG. 1 is illustrated in FIGS. 2-3, one or more of the elements, processes and/or devices illustrated in FIGS. 2-3 may be combined, divided, re-arranged, omitted, eliminated and/or implemented in any other way. Further, the example communication manager 202, the example code detector 204, the example image temporal variation calculator 206, the example image chromatic information calculator 208, the example sound temporal domain flatness calculator 210, the example sound harmonic richness calculator 212, the example boring media event determiner 214, the example machine learning module 216, the example neural network 302, the example boring media detection engine 304, the example validation data set distributor 306, the example boring media detection engine validator 308 and/or, more generally, the example boring media detector 102 of FIGS. 2-3 may be implemented by hardware, software, firmware and/or any combination of hardware, software and/or firmware. Thus, for example, any of the example communication manager 202, the example code detector 204, the example image temporal variation calculator 206, the example image chromatic information calculator 208, the example sound temporal domain flatness calculator 210, the example sound harmonic richness calculator 212, the example boring media event determiner 214, the example machine learning module 216, the example neural network 302, the example boring media detection engine 304, the example validation data set distributor 306, the example boring media detection engine validator 308 and/or, more generally, the example boring media detector 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication manager 202, the example code detector 204, the example image temporal variation calculator 206, the example image chromatic information calculator 208, the example sound temporal domain flatness calculator 210, the example sound harmonic richness calculator 212, the example boring media event determiner 214, the example machine learning module 216, the example neural network 302, the example boring media detection engine 304, the example validation data set distributor 306, and/or the example boring media detection engine validator 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example boring media detector 102 of FIG. 1 may include one or more elements, processes and/or devices in addition to, or instead of, those illustrated in FIG. 2-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
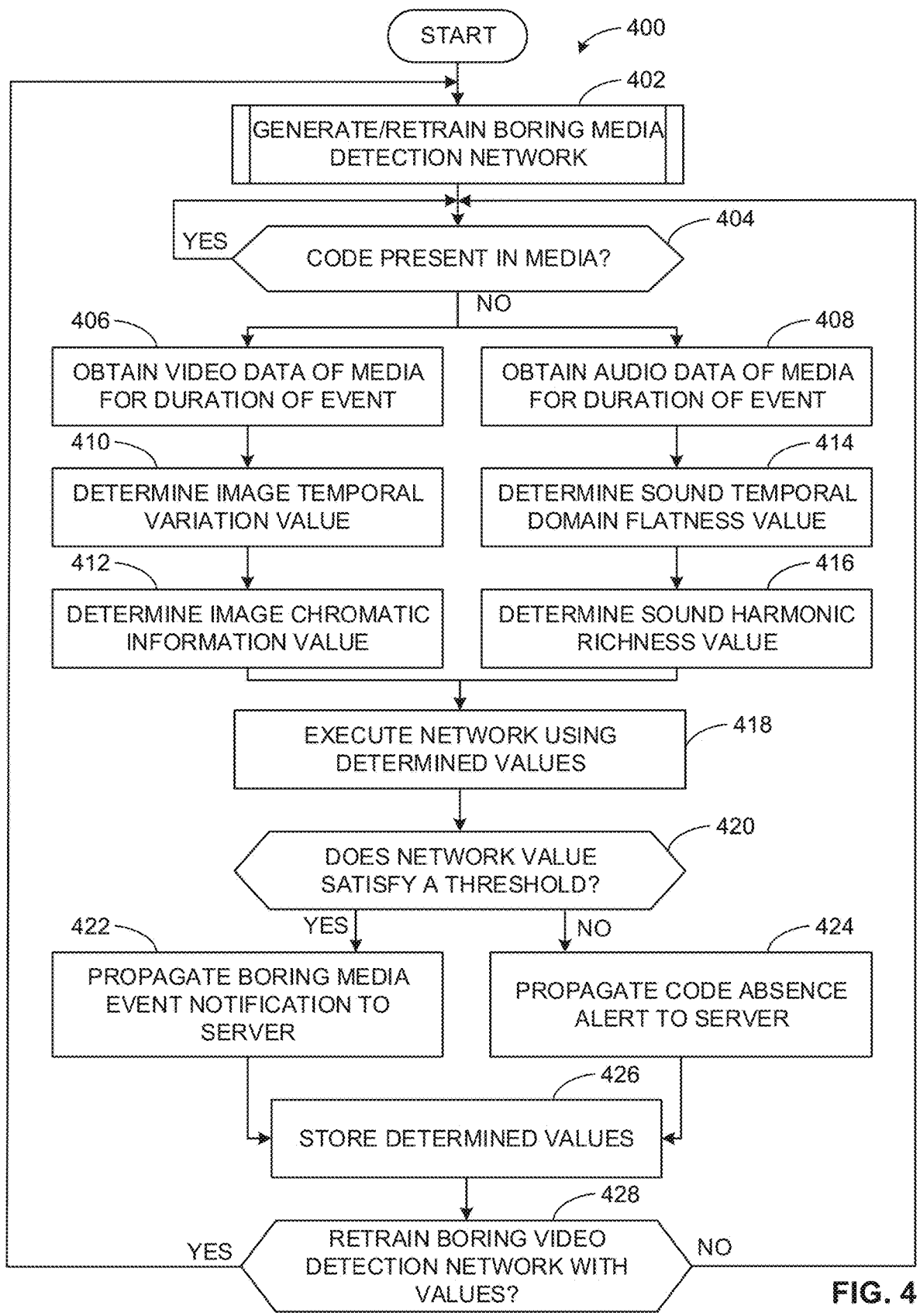
FIGS. 4-5 are flowcharts representative of example machine-readable instructions that may be executed to implement the example boring media detector of FIGS. 1 and/or 2.
Figure 5:
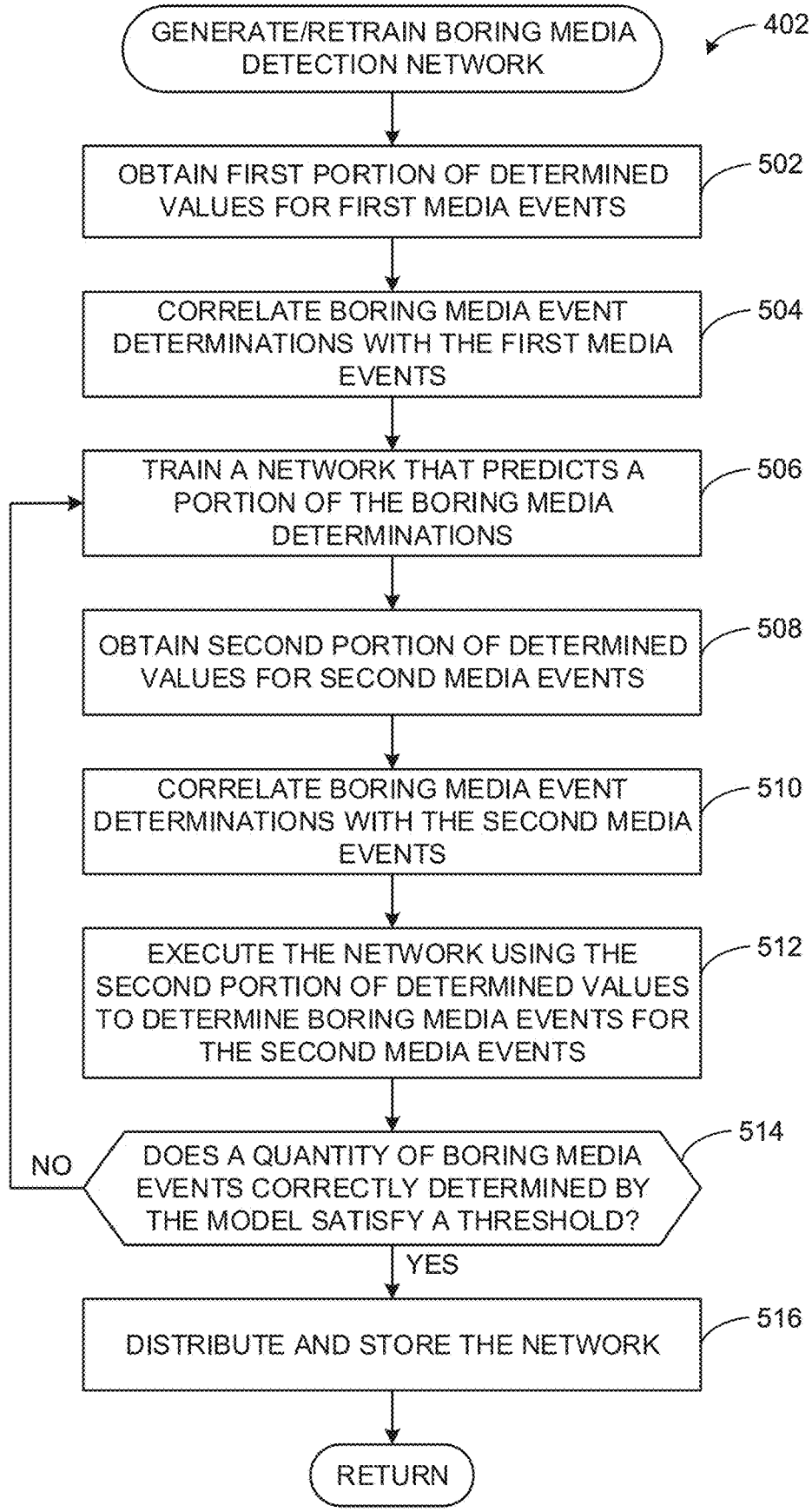

Flowcharts representative of example hardware logic, machine readable instructions, hardware implemented state machines, and/or any combination thereof for implementing the boring media detector 102 of FIGS. 2-3 are shown in FIGS. 4-5. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-5, many other methods of implementing the example boring media detector 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 illustrates a flowchart representation of instructions for a program 400 to implement the example boring media detector 102 to use machine learning techniques to determine (e.g., predict) whether a media event is a boring media event. The program 400 of FIG. 4 begins at block 402. At block 402, further described in conjunction with FIG. 5, the machine learning module 216 utilizes machine learning techniques to train a boring media detection neural network based on data obtained (e.g., retrieved) from the calculated data storer 218. Once the machine learning module 216 validates the network, the network is deployed to the boring media event determiner 214 and processing proceeds to block 404.

At block 404, the code detector 204 determines whether a code (e.g., an identifier) is present in the media received by the boring media detector 102. In some examples, the media meter 132 of FIG. 1 notifies the code detector 204 of the presence and/or absence of a code in the media. In response to detecting a code in the media, processing returns to block 404. Alternatively, in response to the inability to detect a code present in the media, processing proceeds to at least one of block 406 and/or block 408.

At block 406 and 408, the communications manager 202 obtains video data of the media from the video processor 130 and audio data of the media from the audio processor 128, respectively. Further at blocks 406 and 408, the communications manager 202 distributes the video data and the audio data to the feature calculator 205. In response to the distribution of each of the video data and audio data, processing proceeds to each of block 410 and block 412 substantially in parallel in the illustrated example. However, processing may be serial in other examples.

At block 410 and block 412, utilizing the video data of the media received from the communications manager 202, the image temporal variation calculator 206 calculates an image temporal variation (e.g., motion in the video) value and the image chromatic information calculator 208 calculates an image chromatic information (e.g., color change in the video) value. When calculation of the image temporal variation value and the image chromatic information value is complete, each value is distributed to the boring media event determiner 214 for processing by the trained boring media detection neural network.

At block 414 and block 416, utilizing the audio data of the media received from the communications manager 202, the sound temporal domain flatness calculator 210 calculates a sound temporal domain flatness (e.g., variation in intensity (e.g., a decibel level) of the audio) value and the sound harmonic richness calculator 212 calculates a sound harmonic richness (e.g., variation in tone (e.g., pitch) of the audio) value. When calculation of the sound temporal domain flatness value and the sound harmonic richness value is complete, each value is distributed to the boring media event determiner 214 for processing by the trained boring media detection neural network At block 418, in response to receiving all values required to execute the network (e.g., each of the ITV value, ICI value, SHR value, and STF value in the illustrated example), the boring media event determiner 214 executes the trained boring media detection neural network utilizing the received values. In some examples, executing the network further includes performing one or more mathematical operations on the received values to determine an overall value (e.g., a score, a boring event score, a boring media score, etc.) for the media.

At block 420, the boring media event determiner 214 is further to compare the overall value for the media to a threshold. In response to the overall value satisfying a threshold (e.g., the media is a boring media), processing proceeds to block 422. Alternatively, in response to the overall value not satisfying a threshold (e.g., the media is not a boring media), processing proceeds to block 424.

At block 422, in response to determining the overall value satisfies the threshold at block 420, the boring media event determiner 214 propagates a boring media event notification to the example crediting server 138 via the communication manager 202. In some examples, the notification is further to notify the crediting server 138 that the boring media does not include a code and/or identifier.

At block 424, in response to determining the overall value does not satisfy the threshold at block 420, the boring media event determiner 214 propagates a code absence alert to the example SMMS server 140 via the communication manager 202.

At block 426, at least one of the boring media event determiner 214 and/or the feature calculator 205 distributes the calculated values (e.g., ITV value, ICI value, SHR value, STF value, etc.) to the calculated data storer 218 for storage. In some examples, these values will be used to retrain the boring media detection neural network (e.g., the neural network 302).

At block 428, the machine learning module 216 determines whether it is desired to retrain the boring media detection neural network. In some examples, it may be desired to retrain the boring media detection neural network after the calculated data storer 218 stores data for a predetermined quantity of boring media events and/or non-boring media events (e.g., each boring/non-boring media event, 5 boring/non-boring media events, 20 boring/non-boring media events, etc.) In response to determining the boring media detection neural network is not to be retrained, processing returns to block 404, where the code detector 204 determines whether a code is present in received media. Alternatively, in response to determining the neural network is to be retrained, processing returns to block 402.

An example program that can be executed to implement the example machine learning module 216 by generating a boring media detection neural network (FIG. 4, block 402) is illustrated in association with program 402 of FIG. 5. With reference to the preceding figures and associated descriptions, the example program 402 of FIG. 5 begins execution at block 502, at which the neural network 302 of FIG. 3 obtains (e.g. retrieves) a first portion of determined (e.g., calculated) values (e.g., ITV values, ICI values, SHR values, STF values, etc.) from the calculated data storer 218. At block 504, the neural network 302 correlates media event determinations with one or more sets of determined values included in the first portion of calculated values obtained at block 502.

At block 506, utilizing the determined values and the correlated media event determinations, the neural network 302 generates a trained boring media detection neural network using machine learning techniques which are described in further detail in accordance with FIG. 3. In some examples at block 506, the neural network 302 distributes the trained boring media detection neural network to the boring media detection engine 304.

At block 508, the validation data set distributor 306 of FIG. 3 obtains (e.g. retrieves) a second portion of determined (e.g., calculated) values (e.g., ITV values, ICI values, SHR values, STF values, etc.) from the calculated data storer 218. At block 510, the validation data set distributor 306 correlates media event determinations with one or more sets of determined values included in the second portion of calculated values obtained at block 508.

At block 512, the boring media detection engine 304 executes the trained boring media detection neural network utilizing the second portion of determined (e.g., calculated) values obtained at block 510, resulting in a determination (e.g., a prediction that the media is boring media, a prediction that the media is non-boring media, etc.) for the media corresponding with the determined values. In some examples, the boring media detection engine 304 distributes the determinations to the boring media detection engine validator 308 and processing proceeds to block 514.

At block 514, the boring media detection engine validator 308 compares the boring media predictions (e.g., the predicted output) with the boring determinations from block 510 and determines a quantity of predictions that are correct. In response to determining the quantity does satisfy the threshold, processing proceeds to block 516. Alternatively, in response to determining the quantity does not satisfy the threshold, processing returns to block 506.

At block 516, the trained network is deployed to the boring media event determiner 214 and is stored in the machine learning module data storer 310. In response to the completion of block 516, the example program 402 of FIG. 5 ends and processing returns to block 404 of the example program 400 of FIG. 4.

Figure 6A:
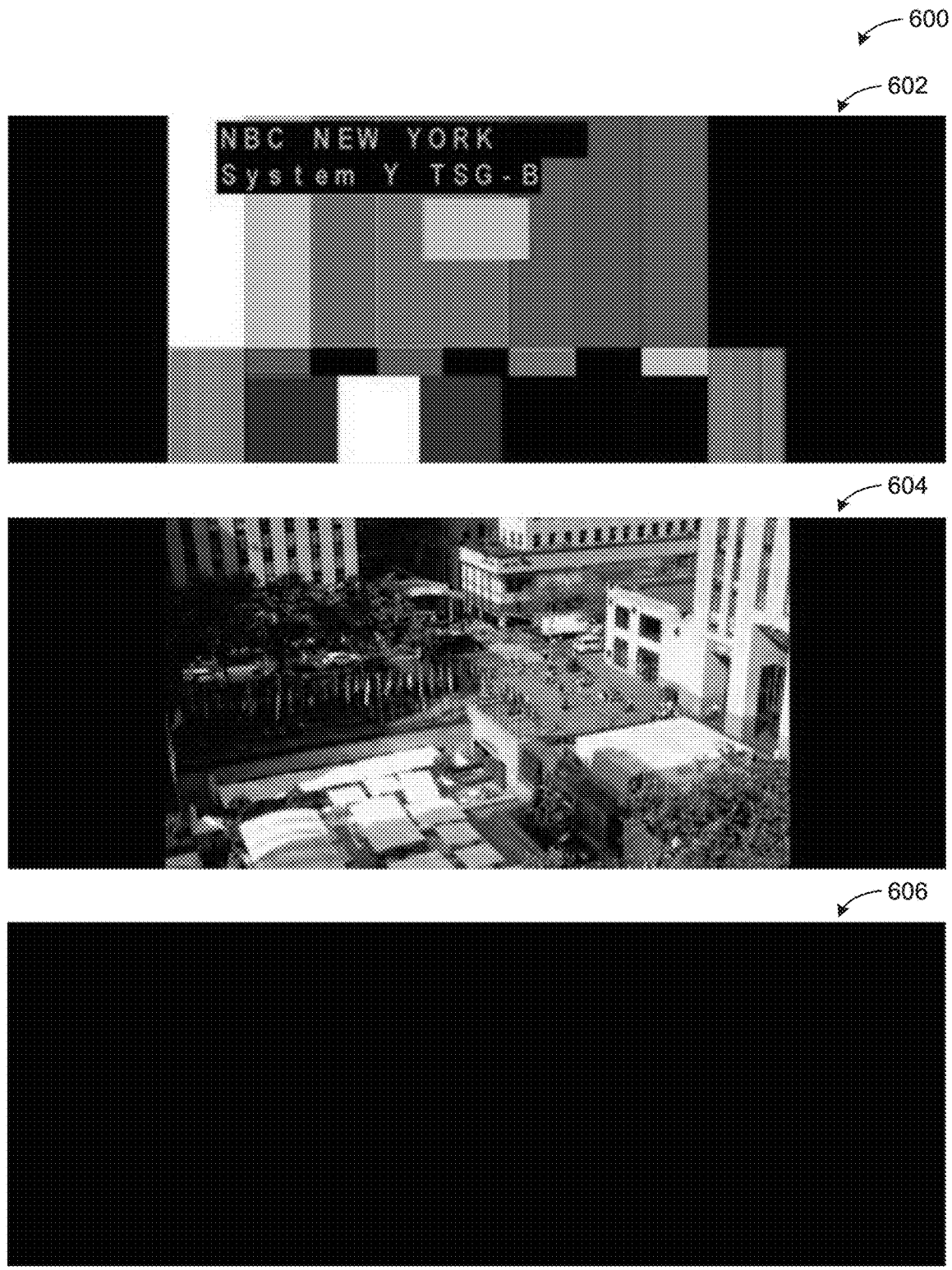
FIGS. 6A-6B illustrate examples of boring media events and non-boring media events.
Figure 6B:
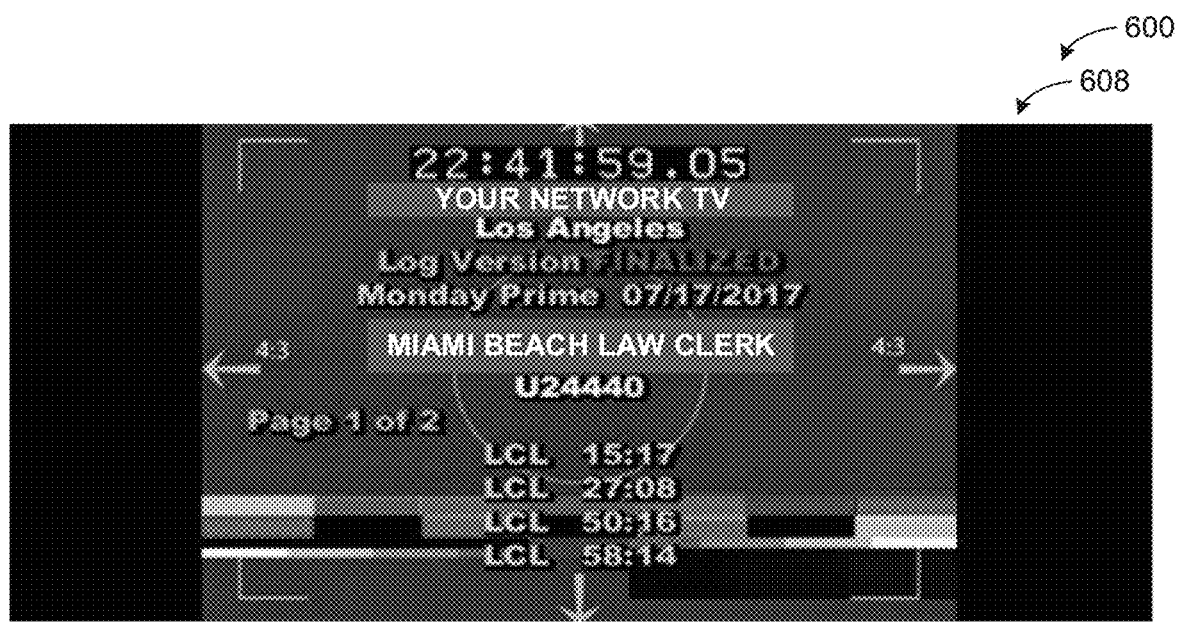
Figure 6B:
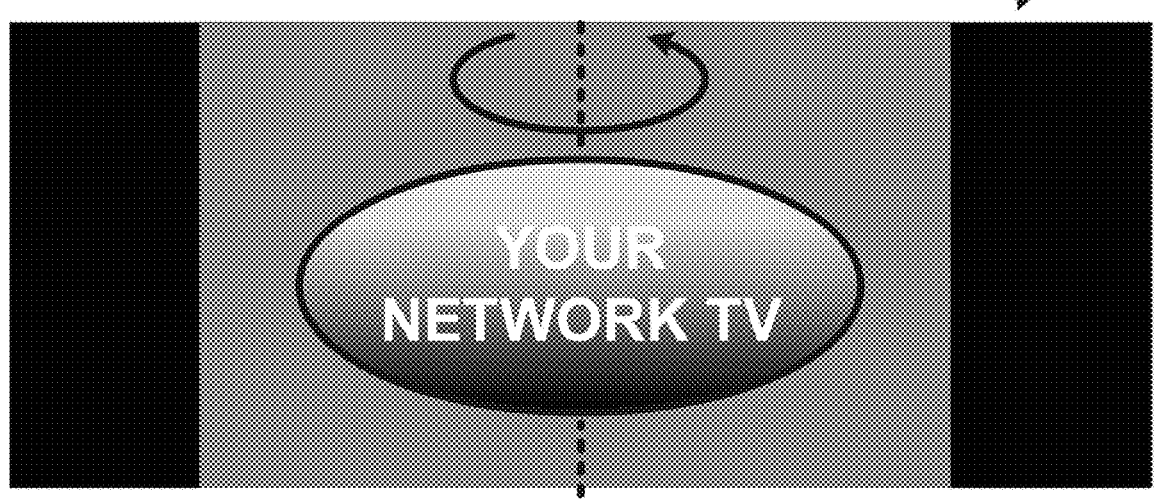
Figure 6B:

FIG. 6A-6B illustrate example displays 600 displaying five examples of boring media (example displays 602, 604, 606, 608, and 610) and one (1) example of non-boring media (example display 612). However, these examples of boring media and non-boring media are not meant to be exhaustive and boring media and non-boring media is therefore not limited thereto. On the contrary, this patent covers all boring media and non-boring media fairly falling within the scope of the claims of this patent.

Looking to the displays 600, the display 602 shows color bars that would constitute boring media and, in some examples, such boring media is displayed in response to one of the media providers 104, 106, and/or 108 not distributing a media feed including non-boring media. In some examples, the various colored strips displayed on the display 602 can change colors. As such, using only ICI (substantial change in color palate) to properly detect the media as "boring media", in some examples, could result in a false negative determination of "non-boring media."

The display 604 shows a webcam feed of a public space that could constitute boring media. In some examples, the webcam feed includes at least one of motion (e.g., change in weather, cars and/or people moving across screen, etc.) and/or a change in the color palate (e.g., changing time of day, change in weather, etc.) As such, using only ITV (substantial motion in the video) and/or ICI (substantial change in color palate) in the video to properly detect the media as "boring media", in some examples, could result in a false negative determination of "non-boring media."

The display 606 shows a blank screen that could constitute boring media and, in some examples, could be displayed in response to one of the media providers 104, 106, and/or 108 not distributing a media feed including non-boring media. In some examples, the blank screen on the display 606 is accompanied by an audio track including music and/or dialogue As such, using only one of or a combination of SHR (substantial change in tone) and/or STF (substantial change in intensity) to properly detect the media as "boring media", in some examples, could result in a false negative determination of "non-boring media."

The display 608 shows station information that could constitute boring media and, in some examples, could be displayed in response to one of the media providers 104, 106, and/or 108 not distributing a media feed including non-boring media. In some examples, the time on the display 606 is changing. As such, using only ITV (substantial motion in the video) to properly detect the media as "boring media", in some examples, could result in a false negative determination of "non-boring media."

The display 610 shows a station logo that could constitute boring media content and, in some examples, could be displayed between media programs. In some examples, the station logo is in motion (e.g., rotation, side to side motion, up and down motion, etc.). As such, using only ITV (substantial motion in the video) to properly detect the media as "boring media", in some examples, could result in a false negative determination of "non-boring media."

In contrast, display 612 shows an example of non-boring media corresponding to a new program or a talk show program, further including two (2) hosts seated behind a desk. In examples where the camera remains focused on the two hosts behind the desk, the video feed on display 612 is not changing considerably. As such, using only one or a combination of ICI (insubstantial change in image coloring) and ITV (insubstantial motion in the video) to properly detect the media as "non-boring media", in some examples, could result in a false positive determination of "boring media." However, in examples where the newscasters are speaking, the use of STF and SHR, in some examples, could result in a proper determination of "non-boring media."

Figure 7A:
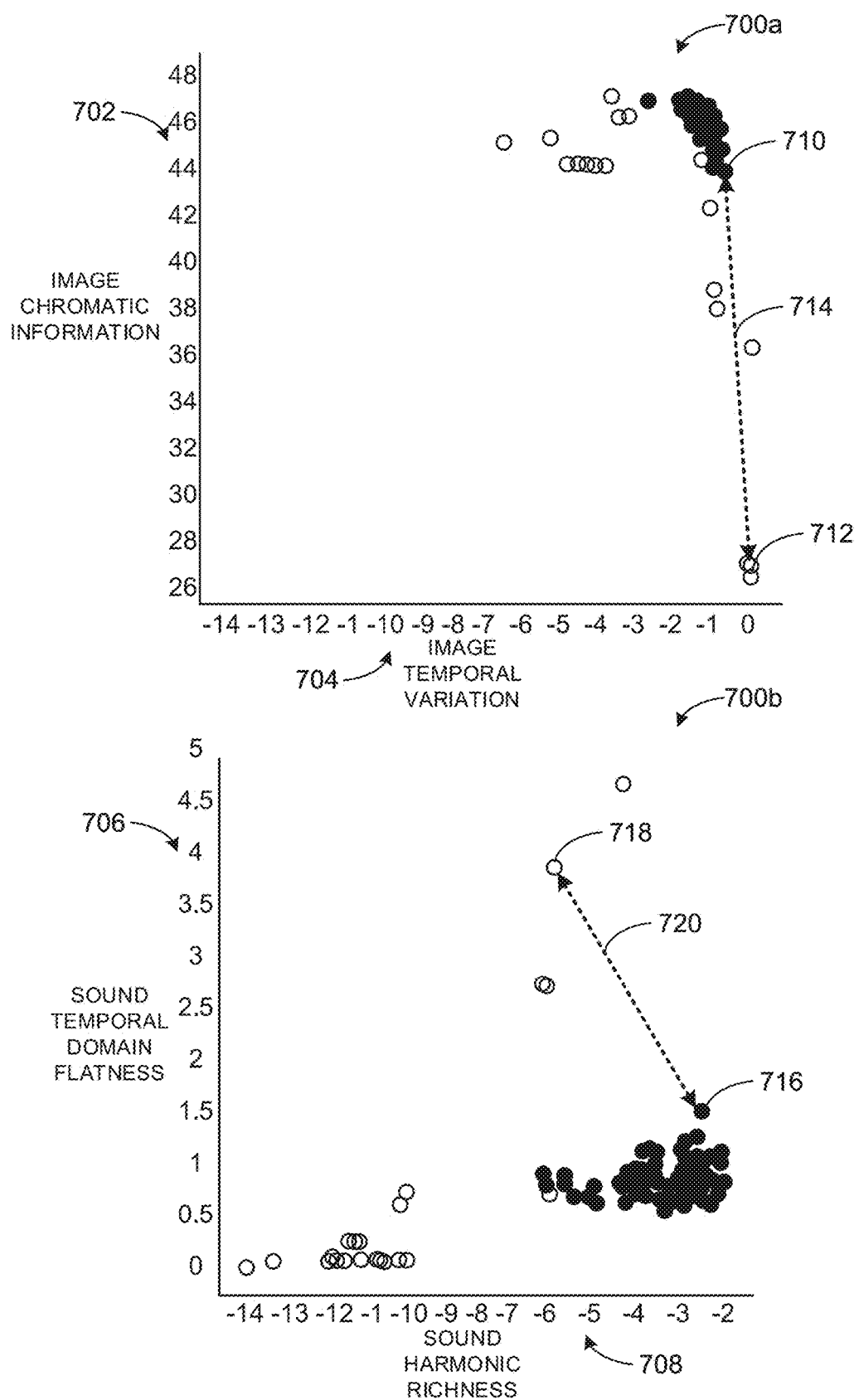
FIGS. 7A-7C illustrate example plots of media event characteristics as calculated by the boring media detector.
Figure 7B:
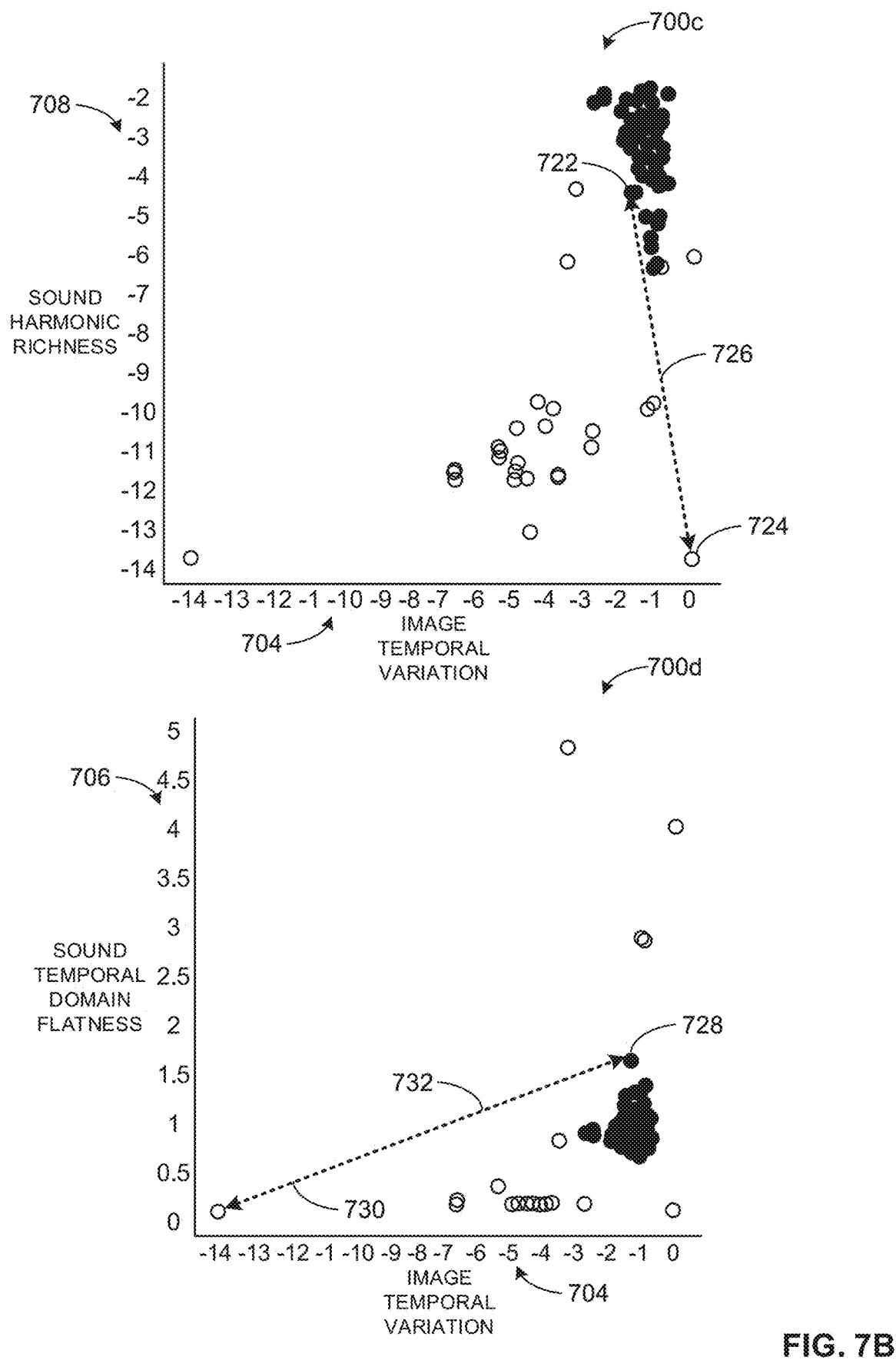
Figure 7C:
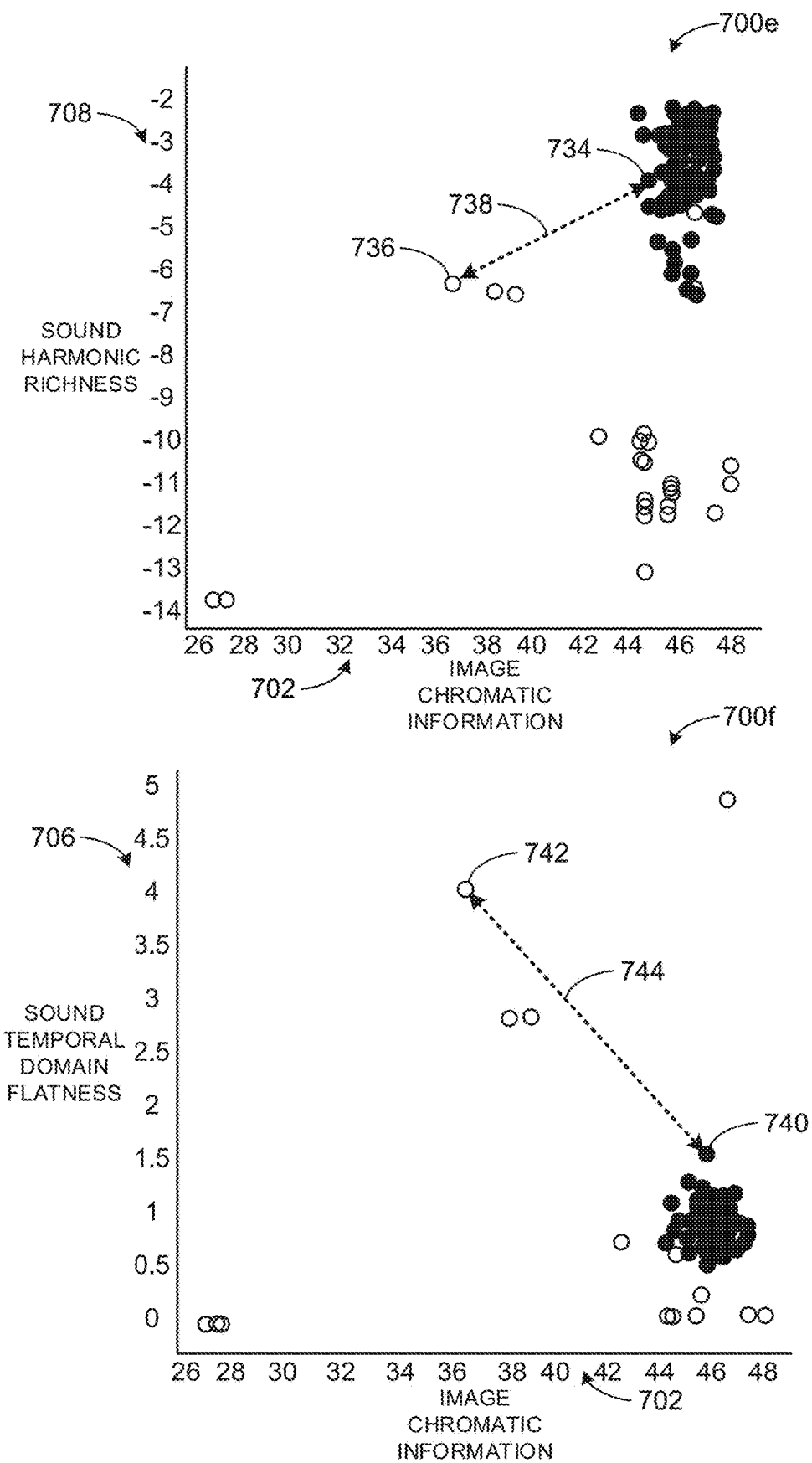

FIGS. 7A, 7B, and 7C show plots 700a, 700b, 700c, 700d, 700e, 700f, and 700g of various combinations of four (4) audio and video characteristics (e.g., features)) plotted against one another (e.g., ITV vs. ICI, STF vs. SHR, etc.). The plots 700a, 700b, 700c, 700d, 700e, 700f, and 700g each include a horizontal axis and a vertical axis depicting different combinations of image chromatic information (ICI) 702, image temporal variation (ITV) 704, sound temporal domain flatness (STF) 706, and sound harmonic richness (SHR) 708. For example, the plot 700a includes ITV 704 on the horizontal axis and ICI 702 on the vertical axis, the plot 700b includes SHR 708 on the horizontal axis and STF 706 on the vertical axis, the plot 700c includes ITV 704 on the horizontal axis and SHR 708 on the vertical axis, the plot 700d includes ITV 704 on the horizontal axis and STF 706 on the vertical axis, the plot 700e includes ICI 702 on the horizontal axis and SHR 708 on the vertical axis, and the plot 700f includes ICI 702 on the horizontal axis and STF 706 on the vertical axis. While in the illustrated example of FIGS. 7A-7C six (6) plots are shown, any quantity of plots using any combination of audio and video characteristics can be calculated.

Each of the plots 700a-700g further includes a set of non-boring media data points (denoted by solid points in the illustrated example of FIGS. 7A-7C). For example, each of data points 710, 716, 722, 728, 734, and 740 are data points for known non-boring media. In some examples, as illustrated in the plots 700a-700g, non-boring media is characterized by large values of ICI, large values of ITV, small values of STF, and large values of SHR. Additionally, each of the plots 700a-700g further includes a set of boring media (e.g., non-media, one of media contents 602, 604, 606, 608, and/or 610, etc.) data points (denoted by hollow points in the illustrated example of FIGS. 7A-7C). For example, each of data points 712, 718, 724, 730, 736, and 742 are data points for known boring media. As shown in FIGS. 7A-7C, in some examples, boring media data points are substantially spaced from non-boring media data points. However, in other examples, boring media data points are substantially similar to non-boring media data points.

As described previously in conjunction with FIG. 3, the machine learning algorithm, in some examples, operates based on the application of weights (e.g., coefficients) to deviations between audio and video parameters (e.g., ITV, ICI, STF, SHR, etc.) and/or deviations between combinations of audio and video parameters for non-boring media and boring media. These deviations, in the illustrated examples of plots 700a-700g, are defined by distances 714, 720, 726, 732, 738, and/or 744 which connect the data points 710, 716, 722, 728, 734, and 740 to the data points 712, 718, 724, 730, 736, and 742, respectively. However, the deviations can be defined by the distance between any non-boring media data point and any boring media data point in the plots 700a-700g. Additionally or alternatively, the deviations can be defined by the distances between an average of a plurality of non-boring media data points and any boring media data point.

Figure 8:
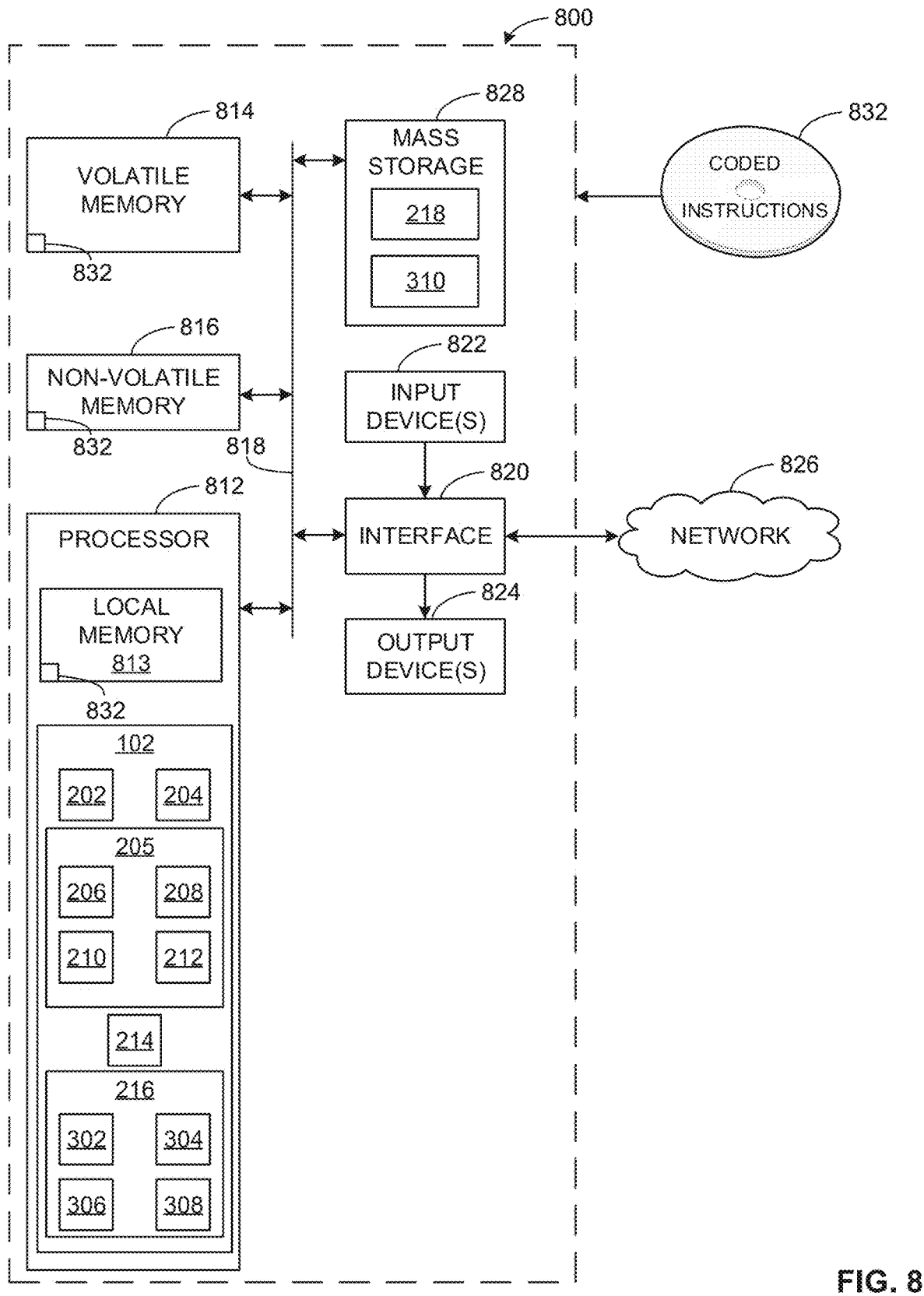
FIG. 8 is a block diagram of an example processor platform structured to execute the example instructions of FIGS. 4 and/or 5 to implement the example system of FIG. 1.

FIG. 8 is a block diagram of an example processor platform 1000 structured to execute the instructions of FIGS. 4-5 to implement the apparatus of FIGS. 2-3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication manager 202, the example code detector 204, the example image temporal variation calculator 206, the example image chromatic information calculator 208, the example sound temporal domain flatness calculator 210, the example sound harmonic richness calculator 212, the example boring media event determiner 214, the example machine learning module 216, the example neural network 302, the example boring media detection engine 304, the example validation data set distributor 306, and the example boring media detection engine validator 308.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In the illustrated example of FIG. 8, the mass storage devices 828 implements the calculated data storer 218 and the machine learning module data storer 310.

The machine executable instructions 832 of FIGS. 4-5 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus, and articles of manufacture have been disclosed that detect and identify boring media events using machine learning techniques. With the ability to detect boring media events, a quantity of false alarms related to an inability of a media meter to detect a code in media (codes are often intentionally not present in boring media) distributed to a SMMS server at an audience measurement entity is reduced, thereby reducing the network traffic between the media meter and the audience measurement entity in addition to reducing processing and storage resources at the audience measurement entity that were previously required to process false alarms.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to detect boring media, the apparatus comprising: a feature calculator implemented by hardware or at least one processor to determine at least a first feature and a second feature associated with at least one of a video feed or an audio feed of monitored media when a media monitoring code is not detected in the monitored media, the first and second features representing different characteristics of at least one of the video feed or the audio feed; and a boring media event determiner implemented by hardware or the at least one processor to: process the first and second features with a neural network; propagate a code absence alert to a first server when an output of the neural network does not satisfy a threshold; and propagate a boring media event notification to a second server when the output of the neural network does satisfy the threshold.

2. The apparatus of claim 1, wherein the first and second features correspond to respective different ones of at least one of an image temporal variation value, an image chromatic information value, a sound temporal domain flatness value, or a sound harmonic richness value, and the feature calculator further includes: an image temporal variation calculator to calculate the image temporal variation value based on at least one of a red plane, a green plane, or a blue plane of the video feed of the monitored media; an image chromatic information calculator to calculate the image chromatic information value based on a histogram of at least one of the red plane, the green plane, or the blue plane of the video feed of the monitored media; a sound temporal domain flatness calculator to calculate the sound temporal domain flatness value based on an envelope of the audio feed of the monitored media; and a sound harmonic richness calculator to calculate the sound harmonic richness value based on a Fourier transform of the audio feed of the monitored media.

3. The apparatus of claim 1, further including a machine learning module to train the neural network based on at least respective first features or second features for a first group of media assets and corresponding boring media detection results for the first group of media assets, the machine learning module including: a boring media detection engine validator to determine a validation output of the trained neural network based on at least respective first features or second features for a second group of media assets and corresponding boring media detection results for the second group of media assets; and a boring media detection engine to deploy the trained neural network to the boring media event determiner when the validation output of the trained neural network satisfies the threshold.

4. The apparatus of claim 3, wherein the boring media detection engine validator instructs the neural network to retrain when the validation output of the neural network does not satisfy the threshold.

5. The apparatus of claim 3, wherein to determine the validation output of the trained neural network, the boring media detection engine validator is to: execute the trained neural network based on at least respective first features or second features for the second group of media assets with the boring media detection engine; and compare trained neural network outputs with the corresponding boring media detection results for the second group of media assets.

6. The apparatus of claim 3, wherein the machine learning module updates the trained neural network with at least one of the first feature or the second feature associated with the monitored media and corresponding boring media detection result for the monitored media.

7. The apparatus of claim 3, wherein the feature calculator calculates a third feature associated with at least one of the video feed or the audio feed of the monitored media, the machine learning module to update the trained neural network based on at least one of the first, second, or third features.

8. A non-transitory computer readable storage medium for detecting boring media comprising instructions that, when executed, cause a machine to at least: determine at least a first feature and a second feature associated with at least one of a video feed or an audio feed of monitored media when a media monitoring code is not detected in the monitored media, the first and second features representing different characteristics of at least one of the video feed or the audio feed; process the first and second features with a neural network; propagate a code absence alert to a first server when an output of the neural network does not satisfy a threshold; and propagate a boring media event notification to a second server when the output of the neural network does satisfy the threshold.

9. The non-transitory computer readable storage medium of claim 8, wherein the first and second features correspond to respective different ones of at least one of an image temporal variation value, an image chromatic information value, a sound temporal domain flatness value, or a sound harmonic richness value and the instructions to calculate at least one of the first feature and the second feature further cause the machine to at least: calculate the image temporal variation value based on at least one of a red plane, a green plane, or a blue plane of the video feed of the monitored media; calculate the image chromatic information value based on a histogram of at least one of the red plane, the green plane, or the blue plane of the video feed of the monitored media; calculate the sound temporal domain flatness value based on an envelope of the audio feed of the monitored media; and calculate the sound harmonic richness value based on a Fourier transform of the audio feed of the monitored media.

10. The non-transitory computer readable storage medium of claim 8, wherein the instructions, when executed to generate the neural network, cause the machine to at least: train the neural network based on at least respective first features or second features for a first group of media assets and corresponding boring media detection results for the first group of media assets; determine a validation output for the neural network based on at least respective first features or second features for a second group of media assets and corresponding boring media detection results for the second group of media assets to; and deploy the trained neural network when the validation output of the neural network satisfies a threshold.

11. The non-transitory computer readable storage medium of claim 10, wherein the instructions, when executed, further cause the machine to at least retrain the neural network when the validation output of the trained neural network does not satisfy the threshold.

12. The non-transitory computer readable storage medium of claim 10, wherein the instructions, when executed to determine the validation output of the neural network, further cause the machine to at least: execute the trained neural network based on respective first features or second features for the second group of media assets; and compare the trained neural network outputs with the corresponding boring media detection results for the second group of media assets.

13. The non-transitory computer readable storage medium of claim 10, wherein the instructions, when executed, further cause the machine to update the trained neural network with the first feature or the second feature associated with the monitored media and corresponding boring media detection result for the monitored media.

14. The non-transitory computer readable storage medium of claim 10, wherein the instructions are further to cause the machine to at least: determine a third feature associated with at least one of the video feed or the audio feed of the monitored media; and update the trained neural network based on at least one of the first, second, or third features.

15. A method for detecting boring media, the method comprising:
   detecting a media monitoring code is absent in monitored media;
   determining at least a first feature and a second feature associated with at least one of a video feed or an audio feed of the monitored media, the first and second features representing different characteristics of at least one of the video feed or the audio feed;
   processing the first and second features with a neural network;
   in response to an output of the neural network not satisfying a threshold, propagating a code absence alert to a first server; and
   in response the output of the neural network satisfying the threshold, propagating a boring media event notification to a second server.

16. The method of claim 15, wherein the first and second features correspond to respective different ones of at least one of an image temporal variation value, an image chromatic information value, a sound temporal domain flatness value, or a sound harmonic richness value, and further including:
   calculating the image temporal variation value based on at least one of a red plane, a green plane, or a blue plane of the video feed of the monitored media;
   calculating the image chromatic information value based on a histogram of at least one of the red plane, the green plane, or the blue plane of the video feed of the monitored media;
   calculating the sound temporal domain flatness value based on an envelope of the audio feed of the monitored media; and calculating the sound harmonic richness value based on a Fourier transform of the audio feed of the monitored media.

17. The method of claim 15, wherein the neural network is generated by:
   training the neural network based on respective first features or second features for a first group of media assets and corresponding boring media detection results for the first group of media assets;
   determining a validation output of the trained neural network based on respective first features or second features for a second group of media assets and corresponding boring media detection results for the second group of media assets; and
   in response to the validation output of the trained neural network satisfying a threshold, deploying the trained neural network.

18. The method of claim 17, further including, in response to the validation output of the trained neural network not satisfying the threshold, retraining the neural network.

19. The method of claim 17, wherein determining the validation output of the neural network further includes: executing the neural network based on respective first features or second features for the second group of media assets; and comparing neural network outputs with the corresponding boring media detection results for the second group of media assets.

20. The method of claim 17, further including: determining a third feature associated with at least one of the video feed or the audio feed of the monitored media; and updating the trained neural network based on at least one of the first, second, or third features.

* * * * *